(12) United States Patent
Goldberg et al.

(10) Patent No.: US 7,596,387 B2
(45) Date of Patent: Sep. 29, 2009

(54) SYSTEM FOR EFFICIENTLY COVERING A SECTORIZED CELL UTILIZING BEAM FORMING AND SWEEPING

(75) Inventors: Steven Jeffrey Goldberg, Downingtown, PA (US); Angelo Cuffaro, Laval (CA)

(73) Assignee: InterDigital Technology Corporation, Wilmington, DE (US)

( * ) Notice: Subject to any disclaimer, the term of this patent is extended or adjusted under 35 U.S.C. 154(b) by 11 days.

(21) Appl. No.: 10/929,240

(22) Filed: Aug. 30, 2004

(65) Prior Publication Data

US 2005/0026562 A1    Feb. 3, 2005

Related U.S. Application Data

(63) Continuation of application No. 10/292,574, filed on Nov. 12, 2002.

(60) Provisional application No. 60/392,597, filed on Jun. 28, 2002.

(51) Int. Cl.
*H04M 1/00*    (2006.01)

(52) U.S. Cl. ............... 455/562.1; 455/25; 455/13.3; 342/367; 342/368

(58) Field of Classification Search ............ 455/25, 455/562.1, 13.3; 342/367, 368, 373, 384; 370/334
See application file for complete search history.

(56) References Cited

U.S. PATENT DOCUMENTS

| | | | |
|---|---|---|---|
| 5,539,413 A * | 7/1996 | Farrell et al. ............... 342/372 |
| 5,596,329 A | 1/1997 | Searle et al. | |
| 5,596,333 A | 1/1997 | Bruckert | |
| 5,598,163 A * | 1/1997 | Cornic et al. .............. 342/70 |
| 5,621,752 A | 4/1997 | Antonio et al. | |
| 5,701,583 A | 12/1997 | Harbin et al. | |
| 5,894,598 A | 4/1999 | Shoki | |
| 5,907,816 A | 5/1999 | Newman | |
| 6,081,233 A | 6/2000 | Johannisson | |
| 6,118,767 A | 9/2000 | Shen et al. | |
| 6,141,335 A | 10/2000 | Kuwahara et al. | |
| 6,167,286 A * | 12/2000 | Ward et al. ............... 455/562.1 |
| 6,178,333 B1 * | 1/2001 | Feuerstein et al. .......... 455/503 |
| 6,205,337 B1 | 3/2001 | Boch | |
| 6,233,466 B1 * | 5/2001 | Wong et al. .............. 455/562.1 |

(Continued)

FOREIGN PATENT DOCUMENTS

CN        12 98 610        6/2001

(Continued)

OTHER PUBLICATIONS

3$^{rd}$ Generation Partnership Project; Technical Specification Group Radio Access Network; Beamforming Enhancements (Release 5); 3G TR 25.887 V1.0.0 (Dec. 2001), pp. 5-8.

(Continued)

*Primary Examiner*—CongVan Tran
(74) *Attorney, Agent, or Firm*—Volpe and Koenig PC

(57) ABSTRACT

A primary station for a wireless communication system transmits and receives communications within a sectorized cell with at least one secondary station. The primary station transmits and receives signals within a beam; and directs the signal transmission and reception as a shaped beam. The shaped beam is directed at a plurality of predetermined directions; either continuously or discretely.

19 Claims, 1 Drawing Sheet

U.S. PATENT DOCUMENTS

| | | | | |
|---|---|---|---|---|
| 6,236,849 B1 | * | 5/2001 | Reudink et al. | 455/342 |
| 6,289,005 B1 | | 9/2001 | Katz | |
| 6,301,238 B1 | | 10/2001 | Hagerman et al. | |
| 6,311,075 B1 | * | 10/2001 | Bevan et al. | 455/562.1 |
| 6,330,460 B1 | | 12/2001 | Wong et al. | |
| 6,345,188 B1 | | 2/2002 | Keskitalo et al. | |
| 6,347,220 B1 | | 2/2002 | Tanaka et al. | |
| 6,370,377 B1 | | 4/2002 | Take et al. | |
| 6,388,634 B1 | | 5/2002 | Ramanujam et al. | |
| 6,453,177 B1 | * | 9/2002 | Wong et al. | 455/562.1 |
| 6,484,031 B1 | | 11/2002 | Ruutu et al. | |
| 6,498,939 B1 | | 12/2002 | Thomas | |
| 6,553,012 B1 | * | 4/2003 | Katz | 370/328 |
| 6,577,879 B1 | * | 6/2003 | Hagerman et al. | 455/562.1 |
| 6,611,695 B1 | * | 8/2003 | Periyalwar | 455/562.1 |
| 6,795,699 B1 | | 9/2004 | McCraw et al. | |
| 6,980,832 B1 | * | 12/2005 | Ylitalo et al. | 455/562.1 |
| 7,123,924 B2 | | 10/2006 | Cuffaro | |
| 7,139,324 B1 | * | 11/2006 | Ylitalo et al. | 375/267 |
| 7,248,883 B2 | | 7/2007 | Cuffaro | |
| 2001/0016504 A1 | * | 8/2001 | Dam et al. | 455/562 |
| 2002/0034943 A1 | * | 3/2002 | Pallonen | 455/424 |
| 2002/0039912 A1 | * | 4/2002 | Yamaguchi et al. | 455/561 |
| 2002/0072393 A1 | | 6/2002 | McGowan et al. | |
| 2002/0094843 A1 | | 7/2002 | Hunzinger | |
| 2002/0146983 A1 | * | 10/2002 | Scherzer et al. | 455/67.1 |
| 2002/0159405 A1 | * | 10/2002 | Garrison et al. | 370/328 |
| 2003/0017853 A1 | | 1/2003 | Kanamaluru et al. | |
| 2003/0040337 A1 | | 2/2003 | Ylitalo | |
| 2003/0193925 A1 | * | 10/2003 | Mujtaba | 370/347 |
| 2004/0002363 A1 | * | 1/2004 | Cuffaro | 455/562.1 |
| 2004/0157637 A1 | * | 8/2004 | Steer et al. | 455/525 |
| 2004/0203929 A1 | | 10/2004 | Akhtenuzzaman | |
| 2004/0259564 A1 | | 12/2004 | Farley et al. | |
| 2007/0265020 A1 | | 11/2007 | Cuffaro | |

FOREIGN PATENT DOCUMENTS

| | | |
|---|---|---|
| CN | 1298610 | 6/2001 |
| CN | 13 46 221 | 4/2002 |
| CN | 1346221 | 4/2002 |
| EP | 09 32 218 | 7/1999 |
| EP | 0932218 | 7/1999 |
| GB | 2 281 007 | 2/1995 |
| GB | 2281007 | 2/1995 |
| HR | 2002-0037635 | 5/2002 |
| JP | 61-75641 | 4/1986 |
| JP | S61-75641 | 4/1986 |
| JP | 09-074375 | 3/1997 |
| JP | 09-200115 | 7/1997 |
| JP | 09200115 | 7/1997 |
| JP | 09-284200 | 10/1997 |
| JP | 09284200 | 10/1997 |
| JP | 10-126139 | 5/1998 |
| JP | 10-256962 | 9/1998 |
| JP | 2000-165319 | 6/2000 |
| JP | 2000-341202 | 12/2000 |
| JP | 2001-127699 | 5/2001 |
| JP | 2001127699 | 5/2001 |
| JP | 2002-152108 | 5/2002 |
| KR | 2000-0048621 | 7/2000 |
| KR | 20000048621 | 7/2000 |
| KR | 2002-0037635 | 5/2002 |
| KR | 20020037635 | 5/2002 |
| WO | 95/09490 | 4/1995 |
| WO | 95/22210 | 8/1995 |
| WO | 96/23329 | 8/1996 |
| WO | 97/41705 | 11/1997 |
| WO | 98/14024 | 4/1998 |
| WO | 98/53561 | 11/1998 |
| WO | 99/33302 | 7/1999 |
| WO | 00/05826 | 2/2000 |
| WO | 01/24385 | 4/2001 |
| WO | 01/28036 | 4/2001 |
| WO | 01/31742 | 5/2001 |
| WO | 02/01672 | 1/2002 |
| WO | 02/15602 | 2/2002 |

OTHER PUBLICATIONS

3rd Generation Partnership Project, "Technical Specification Group Radio Access Network; Beamforming Enhancements (Release 6)," 3G TR 25.887 V6.0.0 (Mar. 2004).

* cited by examiner

SYSTEM FOR EFFICIENTLY COVERING A SECTORIZED CELL UTILIZING BEAM FORMING AND SWEEPING

CROSS REFERENCE TO RELATED APPLICATION(S)

This application is a continuation of U.S. patent application Ser. No. 10/292,574 filed Nov. 12, 2002, which in turn claims priority from U.S. provisional application No. 60/392, 597 filed Jun. 28, 2002, which are incorporated by reference as if fully set forth.

BACKGROUND

Sectoring is a well known technique for providing distinct coverage area from individual cell sites and can be achieved with "smart antenna" technology, which is well known in the art. Smart antenna methods dynamically change the radiation pattern of an antenna to form a "beam," which focuses the antenna's topographical coverage.

Beam forming is an enhancement on sectoring in that the sectors can be adjusted in direction and width. Both techniques are employed to: 1) reduce interference between cells and the user equipment (UE) deployed within the cells; 2) increase the range between a receiver and a transmitter; and 3) locate a UE. These techniques are usually applied to the dedicated channels of the UEs once their general location is known.

Prior to knowing the location of a UE, the common channels broadcast information that all UEs may receive. While this information may be sent in static sectors, it is not sent in variable beams. There are inherent inefficiencies in this approach in that extra steps are required to determine the appropriate beam to use for the dedicated data exchanges. Additionally, the beams must be generally large enough to provide a broad coverage area, which in turn means their power with distance from the transmitter is lower. In such cases, they must use higher power, have longer symbol times and/or more robust encoding schemes to cover the same range.

Common channel coverage using a prior art scheme is shown in FIG. 1 as four overlapping wide beams. This provides omni-directional coverage, while giving a degree of reuse to the cell site. It also provides a coarse degree of directivity to the UEs (UE1, UE2) detecting one of the transmissions, by having each sector transmit a unique identifier.

Referring to FIG. 2, downlink dedicated beams between a primary station (P) and several UEs (UE3, UE4) are shown. Assuming the same power from the primary station (P) for FIGS. 1 and 2 and all other attributes being equal, the UEs (UE3 and UE4) shown in FIG. 2 can be further away from the primary station P than the UEs (UE1, UE2) shown in FIG. 1. Alternatively, the coverage areas can be made approximately the same by decreasing the symbol rate and/or increasing the error correction coding. Either of these approaches decreases the data delivery rate. This also applies to the receiver uplink beam patterns of the primary station P; and the same comments about coverage and options apply for data from the UEs to the primary station P.

In the prior art, the range of a primary station P or a UE is generally increased by combinations of higher power, lower symbol rates, error correction coding and diversity in time, frequency or space. However, these methods yield results that fall short of optimized operation. Additionally, there is a mismatch between the common and dedicated communications channels in the ways that coverage is aligned.

There exists a need for efficiently covering a sectorized cell without the drawbacks associated with prior art schemes.

SUMMARY

A communication system for transmitting and receiving communications between at least one primary station and at least one secondary station in a sectorized cell using at least one beam comprising an antenna. The system includes a device for generating and shaping the beam; and a device for sweeping the shaped beam. The sweeping device selectively directs the shaped beam at a plurality of directions.

DETAILED DESCRIPTION OF THE PREFERRED EMBODIMENT(S)

Figure 1:
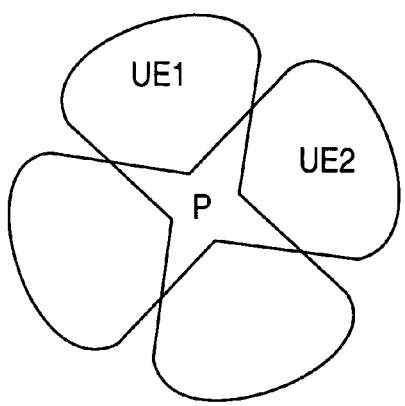
FIG. 1 is a prior art common channel coverage scheme between a primary station and several UEs with four overlapping wide beams.

The present invention will be described with reference to the drawing figures where like numerals represent like elements throughout. The foregoing statements about beam forming are applicable to both transmission of the signal and its reception. For example, narrower transmission beams cause less interference to those devices outside the beam. Conversely, a narrower reception beam decreases interference from signals outside the beam. The foregoing description of the invention is applicable to both the reception and transmission of signals. The context of a particular part of the description will sometimes explicitly refer to reception or transmission when this is not case.

The common channels are utilized, as their name implies, by all devices. The system and method of the present invention formats these common channels in a fashion that provides useful information to the system and the UE for eventual establishment of the dedicated channels.

Figure 3:
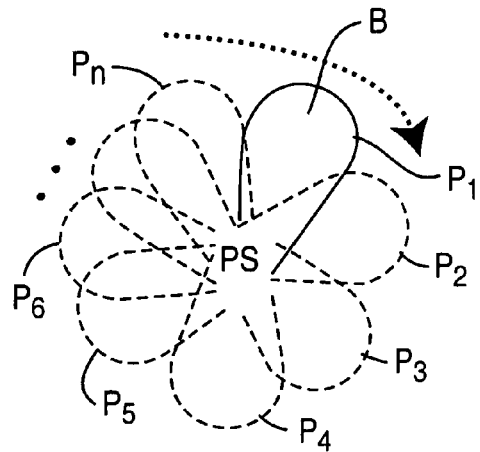
FIG. 3 is a rotating common channel beam emanating from a primary station.
Figure 2:
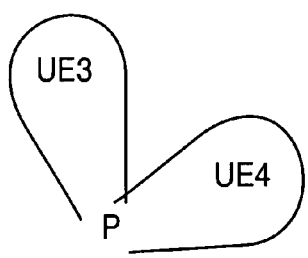
FIG. 2 is a prior art scheme of downlink dedicated beams between a primary station and several UEs using dedicated beams.

Referring to FIG. 3, the dashed outlines represent possible positions $P_1$-$P_n$ for a common channel beam B emanating from a primary station (PS). At a particular time period, the beam B exists only in one of the positions $P_1$ as illustrated by the solid outline. The arrow shows the time sequencing of the beam B. In this illustration, the beam B sequentially moves from one clockwise position $P_1$ to another $P_2$-$P_n$, although a clockwise rotation is not necessary.

The system provides for identifying the beam B at each of the positions $P_1$-$P_n$. A first embodiment for identifying the beam B is to send a unique identifier while the beam B is at in each position $P_1$-$P_n$. For example, at a first position $P_1$ a first identifier $I_1$ will be transmitted, at a second position $P_2$ a second identifier $I_2$ will be generated, and so on for each of the positions $P_1$-$P_n$. If the beam B is swept continuously, a different identifier $I_1$-$I_m$ may be generated for each degree, (or preset number of degrees), of rotation.

A second embodiment for identifying the position $P_1$-$P_n$ of the beam B is to use a time mark as a type of identifier, which the UE returns to the PS. Returning either the time mark (or the identifier) to the PS informs the PS which beam B was detected by the UE. For that time period, the PS now knows the position $P_1$-$P_n$ of the beam B that was able to communicate with the UE. However, it should be noted that due to possible reflections, this is not necessarily the direction of the UE from the PS.

A third embodiment for identifying the position $P_1$-$P_n$ of the beam B is to use time-synchronization. The beam B is positioned and correlated with a known time mark. One way of achieving this would be for both the UEs and the PS to have access to the same time reference, such as the global positioning system (GPS), National Institute of Standards and Technology internet time or radio time broadcasts (WWV) or local clocks with adequate synchronization maintained.

A fourth embodiment for identifying the position $P_1$-$P_n$ of the beam B is for the UEs and the PS to synchronize to timing marks coming from the infrastructure transmissions. The UEs can detect beam transmissions identifying the PS, but not necessarily the individual beam B positions $P_1$-$P_n$. By the UE reporting back to the PS the time factor when it detected the beam B, the PS can determine which beam B the UE is referencing. The benefit of this embodiment is that the common channel transmission does not have to be burdened with extra data to identify the position $P_1$-$P_n$ of the beam B.

A fifth embodiment for identifying the position of the beam B is to incorporate a GPS receiver within the UE. The UE can then determine its geographical location by latitude and longitude and report this information to the PS. The PS can then use this information to precisely generate the direction of the beam B, beam width and power. Another advantage of this embodiment is the precise location obtained of the UE, which will allow users to locate the UE if the need arises.

Figure 4:
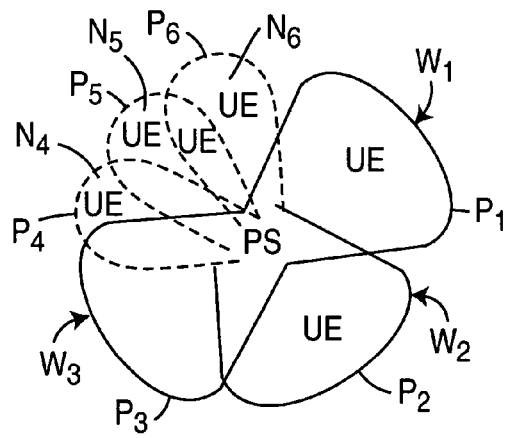
FIG. 4 is a beam configuration for known uneven distribution of UEs.

Referring to FIG. 4, the location pattern may be tailored as desired by the system administrator. In this manner, the PS may position the beam B in a pattern consistent with the expected density of UEs in a particular area. For example, a wide beam $W_1$, $W_2$, $W_3$ may be cast in positions $P_1$, $P_2$, $P_3$, respectively, with few UEs, and more narrow beams $N_4$, $N_5$, $N_6$ cast in positions $P_4$, $P_5$, $P_6$, respectively, with many UEs. This facilitates the creation of narrower dedicated beams B in the denser areas, and also increases the capacity for the uplink and downlink use of the common channels to establish initial communications.

The beam width manipulation is preferably performed in real time. However, the conditions of communication and the nature of the application determine the suitability of number of beam positions $P_1$-$P_n$ and their associated beam width patterns. The beam patterns formed should be sufficiently wide such that the number of UEs entering and leaving the beam can be handled without excessive handoff to other beams. A static device can be serviced by a narrow beam. Swiftly moving cars for example, could not be serviced effectively by a narrow beam perpendicular to the flow of traffic, but could be serviced by a narrow beam parallel to the direction of travel. A narrow perpendicular beam would only be adequate for short message services, not for voice services, such as phone calls.

Figure 5:
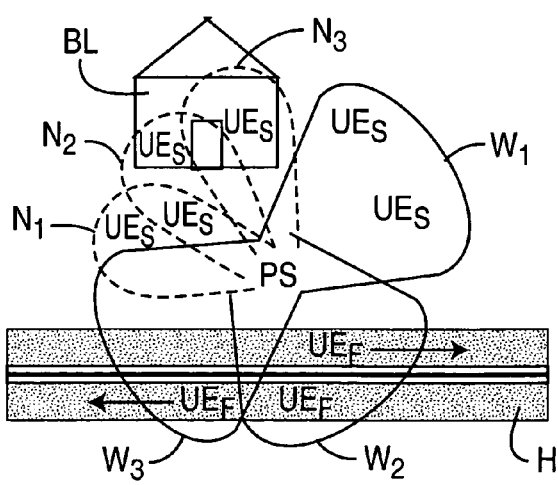
FIG. 5 is a beam configuration having beam width adjusted for traffic type.

Another advantage to using different beam widths is the nature of the movement of UEs within a region. Referring to FIG. 5, a building BL is shown (representing an area having primarily slower moving pedestrian-speed devices $UE_s$), and a highway H is shown (representing an area having primarily faster-moving devices $UE_f$). The slower speed devices $UE_s$ can be served by narrow beams $N_1$-$N_3$ that are likely to be traversed during a communication time period. Alternatively, the faster moving devices $UE_f$ require wider beams $W_1$-$W_3$ to support a communication.

Beam width shaping also decreases the frequency of handover of UEs from one beam B to another. Handover requires the use of more system resources than a typical communication since two independent communication links are maintained while the handover is occurring. Handover of beams also should be avoided because voice communications are less able to tolerate the latency period often associated with handover.

Data services are packet size and volume dependent. Although a few small packets may be transmitted without problems, a large packet requiring a significant number of handovers may utilize excessive bandwidth. This would occur when links are attempted to be reestablished after a handover. Bandwidth would also be used up when multiple transmissions of the same data is sent in an attempt to perform a reliable transfer.

Downlink common channel communication will often be followed by uplink transmissions. By knowing the transmission pattern of the PS, the UE can determine the appropriate time to send its uplink transmission. To perform the necessary timing, a known fixed or broadcast time relationship is utilized. In the case of a fixed relationship, the UE uses a common timing clock. The UE waits until a predetermined time in which the PS has formed a beam over the UE's sector before transmitting. In the case of a broadcast, the PS informs the UE when to send its uplink signal. The uplink and downlink beam forming may or may not overlap. It is often an advantage to avoid overlap, so that a device responding to a transmission can respond in less time than would be required to wait an entire antenna beam forming timing cycle for the same time slot to occur.

It should be noted that CMDA and other RF protocols utilize some form of time division. When responding to these types of temporal infrastructures, both beam sectoring and the time slots of the protocol would be of concern. Other non-time dependent RF protocols, such as slotted Aloha would only involve sectoring.

The embodiment described hereinbefore was directed to "sweeping" the beam B around a PS in a sequential manner. In many instances this will typically be the most convenient way to implement the invention. There are, however, alternative ways to assume the various positions. For instance, it may be desirable to have more instances of coverage in certain areas. This could be done generating the beam in a sequence of timed positions. For instance, if there are 7 positions, (numbered 1 through 7), a sequence of (1, 2, 3, 4, 2, 5, 6, 2, 7, 1) could be used. This would have the area covered by beam position number 2 more often than other positions, but with the same dwell time. It might also be desirable to have a longer dwell time in a region. The sequence (1, 2, 3, 4, 4, 5, 6, 7, 1) for instance would have beam position number 4 remain constant for two time periods. Any suitable sequencing could be utilized and modified as analysis of the situation warranted.

Likewise, it is not necessary to restrict the beam positions to a rotating pattern. The beam positions could be generated in any sequence that serves the operation of the communication system. For example, a pattern that distributed the beams B over time such that each quadrant was covered by at least one beam B might be useful for UEs that are closer to the PS and are likely to be covered by more than one beam position.

It should be noted that similar to all RF transmissions, an RF signal only stops at a physical point if there is a Faraday-type of obstruction, (e.g. grounded metal roof). Usually the signal dies off, and the boundary is some defined attenuation value from the peak value of the transmission. To provide adequate coverage in the application of this invention, it is preferable that adjacent beam positions overlap to some degree. The overlap will tend to be more pronounced closer to the transmission and reception antennas. Close to an infrastructure antenna site, any UE is therefore likely able to communicate via a number of differently positioned beams B. Devices able to communicate via several beam positions could therefore, if needed, achieve higher data rates using these multiple positions. Devices further away, however, are more likely to be able to communicate via only once instant of beaming, and to obtain higher data rates would require another technique such as a longer dwell time.

Although the features and elements of the present invention are described in the preferred embodiments in particular combinations, each feature or element can be used alone (without the other features and elements of the preferred embodiments) or in various combinations with or without other features and elements of the present invention.

What is claimed is:

1. A primary station configured for transmitting and receiving communications comprising:
    a circuit for generating and shaping a plurality of beams in an array;
    an antenna for transmitting and receiving communication signals within said beams;
    a beam directing circuit for directing said beams; whereby said beam directing circuit selectively directs at least one of the shaped beams at a plurality of directions; and
    a signal identification circuit for sending an identifier to identify the shaped beam in accordance with at least a subset of said plurality of directions;
    wherein said plurality of directions coincide with sectors of a cell, the cell sectors having different sizes and said shaping circuit shapes the beams to cover the cell sectors.

2. The primary station of claim 1 wherein said shaping circuit shapes the beams into one of a plurality of selectable widths, from a wide width to a narrow width.

3. The primary station of claim 1 wherein said beam directing circuit selectively directs the shaped beams at the plurality of directions in a predetermined consecutive sequence.

4. The primary station of claim 1 wherein said beam directing circuit selectively directs the shaped beams at the plurality of directions in a predetermined non-consecutive sequence.

5. The primary station of claim 4 wherein said non-consecutive sequence causes the beam directing circuit to selectively direct the beam toward at least one of the plurality of directions more frequently than the other plurality of directions.

6. The primary station of claim 4 wherein said non-consecutive sequence causes the beam directing circuit to selectively direct the beam at some of the plurality of directions for a longer duration than others of the plurality of directions.

7. The primary station of claim 4 wherein said non-consecutive sequence causes the beam directing circuit to selectively direct the beam toward at least one of the plurality of directions more frequently than the other plurality of directions, and causes the beam directing circuit to selectively direct the beam at some of the plurality of directions for a longer duration than others of the plurality of directions.

8. The primary station of claim 1 wherein said beam directing circuit sweeps the shaped beams thereby directing the shaped beams to at least a subset of said plurality of directions.

9. The primary station of claim 8 wherein the cell sectors are different sizes and said circuit for shaping shapes the beams to cover the cell sectors.

10. The primary station of claim 8 wherein said beam directing circuit selectively directs the beams toward at least one of the plurality of directions more frequently than the other plurality of directions.

11. The primary station of claim 8 wherein said beam directing circuit selectively directs the beams at some of the plurality of directions for a longer duration than others of the plurality of directions.

12. The primary station of claim 8 wherein the signal identification circuit identifies the beams by use of a time reference accessed by both the primary station and a secondary station with which the primary station is communicating.

13. The primary station of claim 1 wherein the signal identification circuit identifies the beams in accordance with at least a subset of said plurality of directions by providing a unique identifier.

14. The primary station of claim 1 wherein the signal identification circuit identifies the beams by use of a time reference accessed by both the primary station and a secondary station with which the primary station is communicating.

15. The primary station of claim 1, further comprising a position reporting circuit which provides a position location of the secondary station, the primary station using the position location to identify at least one beam direction for a secondary station with which the primary station is communicating.

16. A method of operating a primary station comprising:
    providing a sectorized cell by using a smart antenna, the sectorized cell using at least one beam;
    selectively shaping and directing said beam to a plurality of directions coinciding with the sectors of the cell wherein the beam is directed to at least one of the plurality of directions move frequently than the others of the plurality of directions;
    identifying the beam in accordance with at least a subset of said plurality of directions.

17. The method of claim 16 comprising shaping the beam into a plurality of selectable widths.

18. The method of claim 16 comprising directing the beam toward least one of the plurality of directions more frequently than the other plurality of directions.

19. The method of claim 16 comprising identifying the beam in accordance with at least a subset of said plurality of directions.

* * * * *

UNITED STATES PATENT AND TRADEMARK OFFICE
CERTIFICATE OF CORRECTION

PATENT NO.       : 7,596,387 B2                     Page 1 of 1
APPLICATION NO.  : 10/929240
DATED            : September 29, 2009
INVENTOR(S)      : Goldberg et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 18 days.

Signed and Sealed this

Twenty-eighth Day of September, 2010

David J. Kappos
*Director of the United States Patent and Trademark Office*